(12) United States Patent
Takahashi

(10) Patent No.: US 9,350,222 B2
(45) Date of Patent: May 24, 2016

(54) INERTIAL DRIVE ACTUATOR

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 135 days.

(21) Appl. No.: 14/272,848

(22) Filed: May 8, 2014

(65) Prior Publication Data

US 2014/0239746 A1    Aug. 28, 2014

Related U.S. Application Data

(63) Continuation of application No. PCT/JP2012/078589, filed on Nov. 5, 2012.

(30) Foreign Application Priority Data

Nov. 11, 2011    (JP) .................................. 2011-247337

(51) Int. Cl.
*H02K 33/18*    (2006.01)
*H02K 33/16*    (2006.01)
*H02N 2/02*    (2006.01)

(52) U.S. Cl.
CPC ................ *H02K 33/18* (2013.01); *H02K 33/16* (2013.01); *H02N 2/025* (2013.01)

(58) Field of Classification Search
CPC ............................... H02K 33/18; H02N 2/025
USPC ...................................... 74/99 R; 310/15–39
See application file for complete search history.

(56) References Cited

U.S. PATENT DOCUMENTS 5,134,335 A *   7/1992   Ikemoto ................. H02N 2/021
                                                          310/323.02
6,069,420 A *   5/2000   Mizzi .................... F15B 11/128
                                                             310/15

(Continued)

FOREIGN PATENT DOCUMENTS

EP          2 731 254 A1      5/2014
JP          01-138974 A       5/1989

(Continued)

OTHER PUBLICATIONS

International Preliminary Report on Patentability with the Written Opinion dated May 22, 2014 received in related International Application No. PCT/JP2012/078589, together with an English language translation dated Jun. 19, 2014.

(Continued)

*Primary Examiner* — Naishadh Desai
(74) *Attorney, Agent, or Firm* — Scully, Scott, Murphy & Presser, P.C.

(57) ABSTRACT

An inertial drive actuator includes a displacement unit, a vibration substrate, a first magnetic field generator which generates a magnetic field, a movable body disposed on a flat surface of the vibration substrate, and which includes a first yoke that concentrates a magnetic flux of an N-pole and an S-pole generated by the first magnetic field generator, at a predetermined position, and a second yoke which is disposed on a side of the vibration substrate, opposite to a direction facing the movable body. A movement in a direction perpendicular to a direction in which, the movable body is driven is regulated mechanically by end portions of the second yoke facing end portions of the first yoke at an outer side of the vibration substrate, and a frictional force is controlled by controlling the magnetic field, and the movable body is driven.

11 Claims, 10 Drawing Sheets

(56) References Cited

U.S. PATENT DOCUMENTS

| | | |
|---|---|---|
| 6,841,899 B2 | 1/2005 | Kaneko |
| 7,462,975 B2 | 12/2008 | Matsuki |
| 7,535,661 B2 | 5/2009 | Matsuki |
| 7,808,153 B2 | 10/2010 | Matsuki |
| 2004/0201443 A1 | 10/2004 | Kaneko |
| 2007/0241640 A1 | 10/2007 | Matsuki |
| 2008/0018202 A1 | 1/2008 | Matsuki |
| 2009/0189486 A1 | 7/2009 | Matsuki |
| 2009/0236931 A1* | 9/2009 | Takahashi ............... F03G 7/065 310/306 |
| 2009/0277300 A1* | 11/2009 | Matsuki ............... G01D 5/2412 74/99 R |
| 2014/0117813 A1 | 5/2014 | Takahashi |

FOREIGN PATENT DOCUMENTS

| | | |
|---|---|---|
| JP | 2004-304942 A | 10/2004 |
| JP | 2007-288828 A | 11/2007 |
| JP | 2008-029108 A | 2/2008 |
| JP | 2009-177974 A | 8/2009 |
| JP | 2013-021782 A | 1/2013 |
| JP | 5185640 B2 | 4/2013 |
| JP | 5722145 B2 | 5/2015 |

OTHER PUBLICATIONS

International Search Report dated Jan. 22, 2013 issued in PCT/JP2012/078589.

Extended Supplementary European Search Report dated Dec. 1, 2015 from related European Application No. 12 84 8080.3.

* cited by examiner

INERTIAL DRIVE ACTUATOR

CROSS-REFERENCE TO RELATED APPLICATION

This application is a continuation application of PCT/JP2012/078589 filed on Nov. 5, 2012 and claims the benefit of priority from the prior Japanese Patent Application No. 2011-247337 filed on Nov. 11, 2011; the entire contents of which are incorporated herein by reference.

BACKGROUND OF THE INVENTION

1. Field of the Invention

The present invention relates to an inertial drive actuator which moves a movable body in a predetermined direction.

2. Description of the Related Art

An actuator which displaces a drive shaft in an axial direction by supplying a saw-tooth wave drive pulse to an electromechanical transducer fitted to the drive shaft, and moves a movable member that has been friction-fitted to the drive shaft in the axial direction has been known (hereinafter, such actuator will be called as an 'impact drive actuator' or an 'inertial drive actuator').

Such impact drive actuator has been disclosed in patent literature 1. FIG. 10A is a diagram showing an arrangement thereof. A vibration member 103 is inserted through holes cut through rising portions of a supporting member 101, and is disposed to be movable in an axial direction of the vibration member 103. One end of the vibration member 103 is fixed to one end of a piezoelectric element 102, and the other end of the piezoelectric element 102 is fixed to the supporting member 101.

Therefore, the vibration member 103 vibrates in the axial direction with the vibration of the piezoelectric element 102. Two holes are provided in a movable body 104 as well, and the vibration member 103 is inserted through these two holes. Furthermore, a plate spring 105 is fitted to the movable body 104 from a lower side, and a protrusion provided to the plate spring 105 is pressed against the vibration member 103. Due to pressing by the plate spring 105 in such manner, the movable body 104 and the vibration member 103 are friction-fitted mutually.

Drive waveforms for driving the impact drive actuator are shown in FIG. 10B and FIG. 10C. FIG. 10B shows a drive waveform for moving the movable body 104 toward right and FIG. 10C shows a drive waveform for moving the movable body 104 toward left. A principle of operation of the impact drive actuator will be described by using these drive waveforms. In the following description, a direction in which, the piezoelectric element 102 elongates is let to be a leftward direction, and a direction in which, the piezoelectric element 102 contracts is let to be a rightward direction.

A vertical axis V indicates voltage and a horizontal axis T indicates time. Same reference numerals are used in FIG. 10A and FIG. 10B.

In a case of moving the movable body 104 in the rightward direction, the drive waveform shown in FIG. 10B is used. The drive waveform has a portion that rises steeply and a portion that falls gently. At the portion where the drive waveform rises steeply, the piezoelectric element 102 is elongated rapidly. Here, since the vibration member 103 is fixed to the piezoelectric element 102, the vibration member 103 moves leftward rapidly with the rapid elongation of the piezoelectric element 102. At this time, as an inertia of the movable body 104 overcomes a friction-fitting force between the movable body 104 and the vibration member 103 (frictional force between the movable body 104 which is pressed by the plate spring 105, and the vibration member 103), the movable body 104 halts at that position without moving in the leftward direction.

Next, at the portion where the drive waveform falls gently, the piezoelectric element 102 contracts gradually. The vibration member 103 moves slowly in the rightward direction with the gradual contraction of the piezoelectric element 102. In this case, the inertia of the movable body 104 is incapable of overcoming the friction-fitting force between the movable body 104 and the vibration member 103. Therefore, the movable body 104 moves in the rightward direction, with the movement of the vibration member 103.

On the other hand, in a case of moving the movable body 104 in the leftward direction, the drive waveform shown in FIG. 10C is to be used. The drive waveform has a portion that rises gently and a portion that falls steeply. At the portion where the drive waveform rises gently, the piezoelectric element 102 is elongated gently. In this case, the vibration member 103 moves slowly in the leftward direction in response to the gentle elongation of the piezoelectric element 102. In this case, the inertia of the movable body is not capable of overcoming the friction-fitting force between the movable body 104 and the vibration member 103. Therefore, the movable body 104 moves in the leftward direction, with the movement of the vibration member 103.

Next, at the portion where the drive waveform rises steeply, as the inertia of the movable body 104 overcomes the friction-fitting force between the movable body 104 and the vibration member 103, as shown in FIG. 10B, the movable body 104 halts at that position without moving in the rightward direction.

By the plate spring 105 being pressed against the vibration member 103 all the time, the movable body 104 is supported by the vibration member 103 by friction. Therefore, even when the movable body 104 is at halt, that position is maintained.

In such manner, the impact drive actuator is an actuator in which, the friction-fitting and inertia between the movable body 104 and the vibration member 103 are used, and is an actuator which is capable of moving the movable body 104 by using the drive waveforms shown in FIG. 10B and FIG. 10C.

CITATION LIST

Patent Literature

Patent literature 1: Japanese Patent Application Laid-open Publication No. 2007-288828.

SUMMARY OF THE INVENTION

An inertial drive actuator includes a displacement unit which causes a minute displacement in a first direction, and in a second direction which is opposite to the first direction, a vibration substrate which undergoes reciprocating movement due to the minute displacement caused by the displacement unit, a first magnetic field generator which generates a magnetic field, a movable body which is disposed on a flat surface of the vibration substrate, and which includes a first yoke that concentrates a magnetic flux of an N-pole (North pole) and an S-pole (South pole) generated by the first magnetic field generator, at a predetermined position, and a second yoke which is disposed on a side of the vibration substrate, opposite to a direction facing the movable body, and a movement in a direction perpendicular to a direction in which, the movable body is driven is regulated mechanically by end portions of the second yoke facing end portions of the first yoke at an outer side of the vibration substrate, and a frictional force acting between the movable body and the vibration substrate is controlled by controlling the magnetic field generated by the first magnetic field generator, and the movable body is driven.

Moreover, according to a preferable aspect of the present invention, it is desirable that the inertial drive actuator includes a second magnetic field generator, which generates a magnetic field in addition to the magnetic field generated by the first magnetic field generator so that, a magnetic attractive force or a magnetic repulsive force acts in a direction of the movable body, opposite to the vibration substrate.

Furthermore, according to another preferable aspect of the present invention, it is desirable that the first magnetic field generator is an electromagnetic coil.

According to still another preferable aspect of the present invention, it is desirable that the second magnetic field generator is a permanent magnet.

According to still another preferable aspect of the present invention, it is desirable that the displacement unit is a piezoelectric element.

According to still another preferable aspect of the present invention, it is desirable that the vibration substrate is a non-magnetic body.

According to still another preferable aspect of the present invention, it is desirable that the vibration substrate includes a non-magnetic portion and a magnetic portion.

According to still another preferable aspect of the present invention, it is desirable that at least a part of the vibration substrate includes the first magnetic field generator.

According to still another preferable aspect of the present invention, it is desirable that at least a part of the vibration substrate includes the second magnetic field generator.

According to still another aspect of the present invention, it is desirable that the vibration substrate functions also as the second yoke.

According to still another aspect of the present invention, it is desirable that the movable body includes a permanent magnet.

BRIEF DESCRIPTION OF DRAWINGS

FIG. 1A is a side view, FIG. 1B is a cross-sectional view, FIG. 1C is an A-A cross-sectional view, and FIG. 1D is a cross-sectional view of a modified example;

FIG. 3A is a side view and FIG. 3B is an A-A cross-sectional view;

FIG. 4A is a side view, and FIG. 4B is an A-A cross-sectional view;

FIG. 5A is a side view, and FIG. 5B is an A-A cross-sectional view;

FIG. 8A is a side view, FIG. 8B is a top view, and FIG. 8C is a cross-sectional view;

FIG. 10A is a perspective view showing an arrangement, FIG. 10B is a drive waveform for moving a movable body to right, and FIG. 10C is a drive waveform for moving the movable body to left.

DETAILED DESCRIPTION OF THE INVENTION

An action and an effect due to an arrangement of an inertial drive actuator according to exemplary embodiments of the present invention will be described below. However, the present invention is not restricted to the embodiments described below. In other words, the description of the embodiments includes specific contents in detail for the sake of exemplification, and variations and modifications made in the contents in detail fall within the scope of the present invention. Accordingly, the exemplary embodiments of the present invention below are described without loss of generality of the invention claimed, and without restricting the invention claimed.

First Embodiment

Figure 1A:
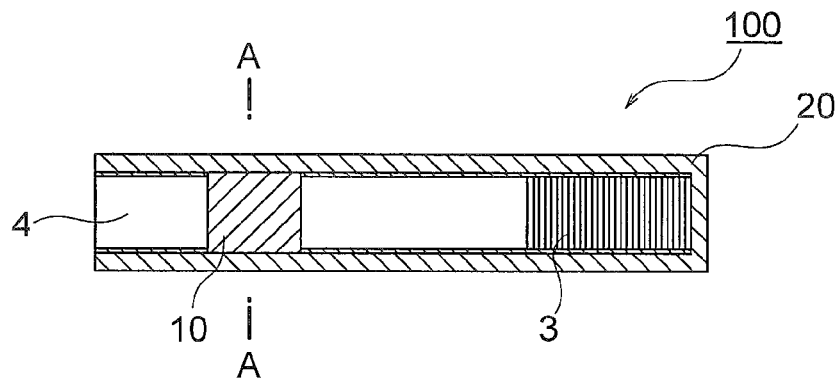
FIG. 1A, FIG. 1B, FIG. 1C, and FIG. 1D are diagrams showing a structure of an inertial drive actuator according to a first embodiment of the present invention, where.
Figure 1B:
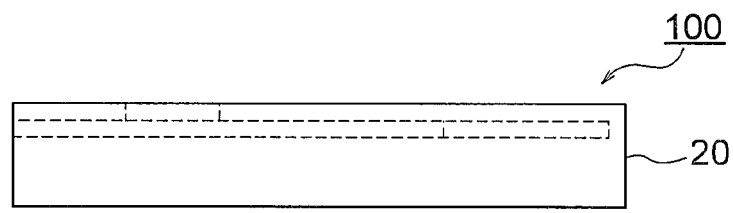
Figure 1C:
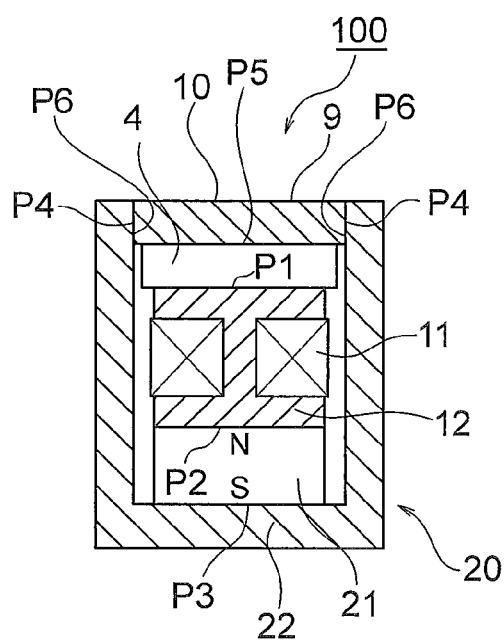

An inertial drive actuator 100 according to a first embodiment of the present invention is shown in FIG. 1A, FIG. 1B, FIG. 1C, and FIG. 1D. FIG. 1A is a top view of the inertial drive actuator 100, FIG. 1B is a side view of the inertial drive actuator 100, and FIG. 1C is a cross-sectional view at a position indicated by A-A in FIG. 1A.

The inertial drive actuator 100 of the first embodiment includes a piezoelectric element (displacement unit) 3, a vibration substrate 4, a movable body 10, and a fixed body 20. The piezoelectric element 3 and the vibration substrate 4 are positioned on an upper portion of the fixed body 20, and the movable body 10 is positioned at an upper portion of the vibration substrate 4. The movable body 10 has a function of a first yoke 9.

Both the piezoelectric element (displacement unit) 3 and the vibration substrate 4 are members in the form of a plate. Here, a material of a non-magnetic body is used for the vibration substrate 4. One end of the piezoelectric element 3 and one end of the vibration substrate 4 are connected mechanically. However, an arrangement is not restricted to connecting mechanically, and the two may be connected by sticking. The piezoelectric element 3 and the vibration substrate 4 are placed on an upper portion of the fixed body 20. The piezoelectric element 3 causes a minute displacement, and the vibration substrate 4 undergoes a reciprocating movement due to the minute displacement caused by the piezoelectric element 3.

According to such arrangement, the piezoelectric element 3 (displacement unit) causes minute displacement in a first direction, and in a second direction which is opposite to the first direction. Due to the minute displacement caused by the piezoelectric element 3, the vibration substrate 4 undergoes reciprocating movement. The movable body 10 is disposed on a flat surface of the vibration substrate 4. The movable body 10 disposed on the flat surface of the vibration substrate 4 has a function of the first yoke 9, which is a function of concentrating a magnetic flux of an N-pole and an S-pole generated by a coil 11 (first magnetic field generator) at a predetermined position.

In the cross-sectional view shown in FIG. 1C, the coil 11 (first magnetic field generator) which generates a magnetic field so that a magnetic attractive force or a magnetic repulsive force acts toward the fixed body 20 is provided in a direction of the vibration substrate 4, opposite to the movable body 10. The coil 11 is a coil such as an electromagnetic coil wound around a coil-core.

Moreover, second yokes 12 and 22 (magnetic flux inducing members) which induce a magnetic flux generated by the coil 11 are formed around the coil 11 such that, both the N-pole and the S-pole of the magnetic flux generated by the coil are concentrated. Here, a member for winding the coil 11 functions also as the second yoke 12.

The second yokes 12 and 22 control a frictional force acting between the movable body 10 and the vibration substrate 4 by controlling the magnetic field generated by the coil 11 such that, the N-pole and the S-pole of the magnetic flux generated by the coil 11 are concentrated on a surface (predetermined position) toward the fixed body 20, and drive the movable body 10.

Here, end portions of the first yoke 9, or in other words the movable body 10, and end portions of the second yoke 22 are face-to-face. Accordingly, it is possible to regulate mechanically a movement in a direction perpendicular to a direction in which, the movable body 10 is driven.

According to such arrangement, since the coil 11 is provided toward the fixed body 20, there is no wire on the movable body 10. Therefore, a durability of wiring is improved and breaking of wire is prevented, thereby making it possible to carry out stable drive over a long period of time. Since the wire does not exist, it is possible to carry out stable drive without giving rise to any load, and therefore it is desirable.

It is possible to have an arrangement in which, a permanent magnet 21 (second magnetic field generator) which generates a magnetic field so that the magnetic attractive force or the magnetic repulsive force acts in a direction of the vibration substrate 4, opposite to the movable body 10 is provided in addition to the coil 11 (first magnetic field generator).

The second yoke 22 is disposed with respect to the permanent magnet 21 (second magnetic field generator) to induce the magnetic flux generated in the permanent magnet 21 (second magnetic field generator) such that both the N-pole and the S-pole of the magnetic flux generated in the permanent magnet (second magnetic field generator) along with the coil 11 (first magnetic field generator) are concentrated on a surface (predetermined position) toward the movable body 20. Moreover, the frictional force acting between the movable body 10 and the vibration substrate 4 is controlled by controlling the magnetic field generated by at least one of the magnetic field generators namely, the coil 11 (first magnetic field generator) and the permanent magnet 21 (second magnetic field generator), and the movable body 10 is driven.

The description will be made more concretely. As shown in FIG. 1C, the fixed body 20 includes the coil 11, the second yokes (magnetic flux inducing members) 12 and 22, and furthermore, the permanent magnet 21 (second magnetic field generator). The permanent magnet 21 is a rectangular parallelepiped member of which, one of surface sides (upper-side surface) is an N-pole and the other surface side (lower-side surface) is an S-pole. Moreover, in the first embodiment, a length in a longitudinal direction of the coil 11 is almost same as a length in the longitudinal direction of the permanent magnet 21. The second yoke 22 is a box-shaped member. The permanent magnet 21 is fixed to a bottom-surface portion of the second yoke 22. Accordingly, it is possible to show an effect of preventing leakage of the magnetic flux to an outside.

The coil 11 is fixed to the permanent magnet 21 (or the second yoke 22) all the time. Therefore, the coil 11 does not move with the movement of the movable body 10. Consequently, the wires connected to the coil 11 do not move.

In such manner, by providing the permanent magnet 21, a retaining force acts on the movable body 10 all the time even when no electric current is passed through the coil 11. Therefore, it is possible to drive stably even when an overall system of the inertial drive actuator is inclined.

Modified Example of First Embodiment

Figure 1D:
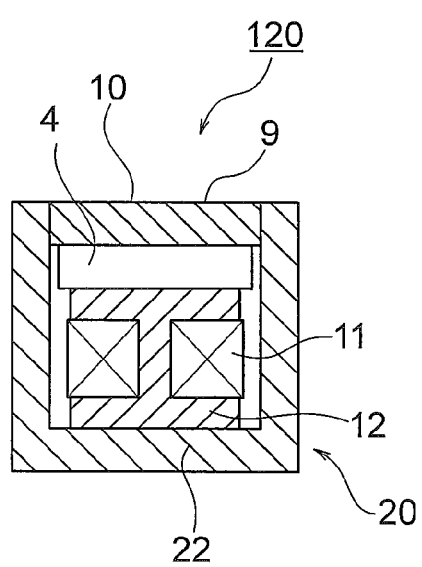

Moreover, it is possible to let a cross-sectional arrangement as shown in FIG. 1D with respect to an arrangement shown in FIG. 1C. An inertial drive actuator 120 shown in FIG. 1D does not include the permanent magnet 21. Therefore, with respect to the vibration substrate 4, the movable body 10 is in a state of being placed by a gravitational force.

Next, an operation of the inertial drive actuator 100 will be described below. A driving principle (driving method) will be described by referring to FIG. 7.

In an arrangement such as the one aforementioned, an electric current is passed through the coil 11 such that the N-pole is generated in an upward direction of a paper surface. As the electric current is passed through the coil 11, the N-pole is concentrated at an upper central portion P1 of the second yoke 12, and the S-pole is concentrated at a lower central portion P2 of the second yoke 12.

Here, the second yoke 22 is disposed on both sides of the coil 11. Therefore, it is possible to suppress the leakage of the magnetic flux generated by the coil 11 to the outside by the second yoke 22. The N-pole is concentrated at a lower central portion P3 of the second yoke 22. The S-pole is concentrated at two upper end portions P4 of the second yoke 22.

Whereas, in the movable body 10, the S-pole, which is an opposite polarity, is induced at a central portion P5 of the first yoke 9. Moreover, the N-pole is concentrated at both end portions P6 of the movable body 10.

As a result, a strong magnetic adsorptive force is generated toward a lower side of the paper surface with respect to the movable body 10.

Here, the coil 11 and the permanent magnet 21 are in a state of being enclosed by the first yoke 9 and the second yoke 22. Therefore, it is possible to suppress the leakage of the magnetic flux generated by the coil 11 and the permanent magnet 21, to the outside by the first yoke 9 and the second yoke 22.

Whereas, counter to the abovementioned magnetic flux, in a case in which, an electric current is passed through the coil 11 such that the S-pole is concentrated at the upper central portion 21 of the second yoke 12, the magnetic adsorptive force decreases. Moreover, by changing the electric current passed through the coil 11, it is possible to change the strength of a normal force acting on the vibration substrate 4 of the movable body 10. By making such arrangement, it is possible to control the frictional force between the movable body 10 and the vibration substrate 4.

In such manner, in the inertial drive actuator 100 of the first embodiment, the magnetic force is used for moving or driving the movable body 10. In other words, in the inertial drive actuator 100 of the first embodiment, a member such as an elastic body which wears away when the inertial drive actuator 100 is driven, has not been used. Therefore, even when the movable body 10 is moved or driven, it is not worn away. As a result, it is possible to move or to drive (to move to a desired position or to hold at a desired position) the movable body 10 stably over a long period of time. Moreover, in the inertial drive actuator 100 of the first embodiment, since the yoke is used, it is possible to suppress the leakage of the magnetic flux to the outside. Accordingly, since it is possible to generate efficiently the magnetic adsorptive force or the magnetic repulsive force, it is possible to move or to drive the movable body 10 efficiently.

In such manner, in the inertial drive actuator 100 of the first embodiment, the leakage of the magnetic flux to the outside is suppressed for each of the movable body 10 and the fixed body 20, and accordingly, it is possible to concentrate the S-pole and the N-pole in a predetermined area. Therefore, it is possible to generate the magnetic adsorptive force efficiently toward lower side of the paper surface between the movable body 10 and the fixed body 20.

As aforementioned, in the inertial drive actuator 100 of the first embodiment, the magnetic power is used for moving or driving the movable body 10. In other words, in the inertial drive actuator 100 of the first embodiment, no member such as an elastic body which is worn away when driven has been used. Therefore, there is no wearing away even when the movable body 10 is moved or driven. As a result, it is possible to move or drive (to move to a desired position or to hold at a desired position) the movable body 10 stably over a long period of time. Moreover, in the inertial drive actuator 100 of the first embodiment, since the yoke is used, it is possible to suppress the leakage of the magnetic flux to the outside. Accordingly, it is possible to generate efficiently the magnetic adsorptive force or the magnetic repulsive force. Therefore, it is possible to move or to drive the movable body 10 efficiently while having a simple and low-cost arrangement.

Moreover, two ends of the fixed body 10 are fixed to a fixing member B (not shown in the diagram). For fixing the fixed body 20 to the fixing member B, the permanent magnet 21 and the second yoke 22 may be fixed to the fixing member B separately. Or, the permanent magnet 21 and the second yoke 22 may be fixed (connected) first, and at least any one of the permanent magnet 21 and the second yoke 22 may be fixed to the fixing member B. Moreover, a fixing member A may be used as the fixing member B. The fixing member A and the fixing member B may be different. The fixing member A for example, is a member provided to one end of the piezoelectric element 3.

Moreover, as shown in FIG. 1C, in a direction orthogonal to a longitudinal direction of the vibration substrate 4 (leftward-rightward direction of the paper surface of FIG. 1C), side-surface end portions of the second yoke 22 are positioned at an outer side of the vibration substrate 4. Moreover, an end portion of the first yoke 9 is close to the second yoke 22. Therefore, in the direction orthogonal to the longitudinal direction of the vibration substrate 4 (leftward-rightward direction of the paper surface of FIG. 1C), the movement of the movable object 10 is regulated.

In such manner, in the inertial drive actuator 100 of the first embodiment, the first yoke 9 and the second yokes 12 and 22 not only have a function of suppressing the leakage of the magnetic flux, but also have a guiding function of regulating the movement of the movable body 10 in a predetermined direction. Therefore, further reduction in the number of components and reduction in size become possible. In the first embodiment, the movement of the movable body 10 has been regulated by the second yoke 22 and the vibration substrate 4. However, as a matter of course, regulating the movement of the movable body 10 by using the fixing member not shown in the diagram and the second yoke 22 is also possible.

Furthermore, as aforementioned, since no wire exists on the movable body 10, a durability of wiring is improved and breaking of wire is prevented, thereby making it possible to carry out stable drive over a long period of time. Moreover, since no wire exists, it is possible to carry out stable drive without giving rise to a load, and therefore it is desirable.

Modified Example

Moreover, it is possible to let a cross-sectional arrangement as shown in FIG. 1D with respect to the arrangement shown in FIG. 1C. The inertial drive actuator 120 shown in FIG. 1D differs from the abovementioned inertial drive actuator 100 of the first embodiment at a point that the inertial drive actuator 120 does not include the permanent magnet 21. Therefore, the movable body 10 is in a state of being placed by the gravitational force with respect to the vibration substrate 4.

Second Embodiment

Figure 2A:
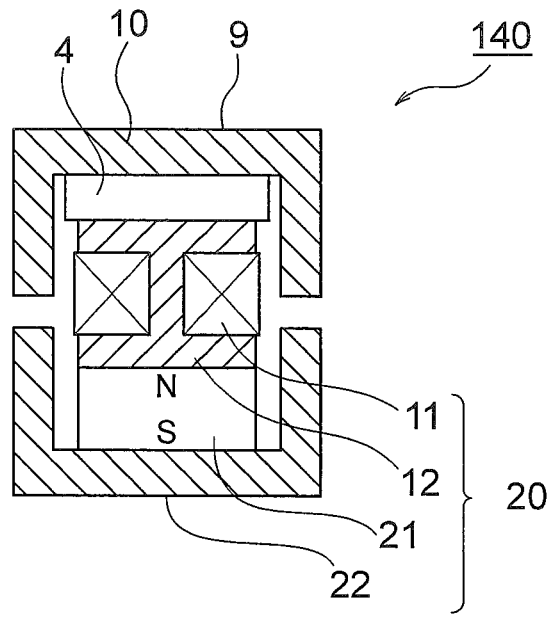
FIG. 2A is a diagram showing a structure of an inertial drive actuator according to a second embodiment of the present invention.

Next, an inertial drive actuator 140 according to a second embodiment of the present invention will be described below. FIG. 2A is a cross-sectional view of the inertial drive actuator 140. Same reference numerals are assigned to components which are same as in the inertial drive actuator 100 of the first embodiment, and description of such components is omitted.

The inertial drive actuator 140 of the second embodiment includes the piezoelectric element 3, the movable body 10, the vibration substrate 4, and the fixed body 20. The movable body 10 is positioned at the upper portion of the vibration substrate 4. Moreover, one end of the piezoelectric element 3 and one end of the vibration substrate 4 are connected mechanically.

Even in the second embodiment, since the coil 11 is provided toward the fixed body 20, no wire exists on the movable body 10. Therefore, the durability of wiring is improved and breaking of wire is prevented, thereby making it possible to carry out stable drive over a long period of time. Moreover, since no wire exists, it is possible to carry out stable drive without giving rise to a load, and therefore it is desirable.

Furthermore, a point at which, the inertial drive actuator 140 differs from the inertial drive actuator 100 of the first embodiment is as follows. The first yoke 9 has a shape that covers the vibration substrate 4, and a front end of a side-surface portion of the first yoke 9 is formed up to a middle of the coil 11.

Moreover, the second yoke 22 has a shape that covers the permanent magnet 21 disposed on a bottom portion. A side-surface portion of the second yoke 22 is formed up to an upper-end portion of the rectangular-shaped permanent magnet 21.

Although there is the abovementioned point of difference, the coil 11 and the permanent magnet 21 are covered by the first yoke 9 and the second yoke 22. Moreover, the first yoke 9 and the second yoke 22 are disposed such that, end portions of the first yoke 9 come closer to the end portions of the second yoke 22. At such points, the arrangement is same as in the inertial drive actuator 100 of the first embodiment.

Therefore, similarly as in the first embodiment, in the inertial drive actuator 140 of the second embodiment, there is no wearing away even when the movable body 10 is moved or driven. As a result, it is possible to move or to drive (to move to a desired position or to hold at a desired position) the movable body 10 stably over a long period of time.

Furthermore, in the inertial drive actuator 140 of the second embodiment, since the yoke is used, it is possible to suppress the leakage of the magnetic flux to the outside. Accordingly, since it is possible to generate efficiently the magnetic adsorptive force or the magnetic repulsive force, it is possible to move or to drive the movable body 10 efficiently.

As aforementioned, in the inertial drive actuator 140 of the second embodiment, the side surface of the first yoke 9 is positioned at an outer side of the two ends of the vibration substrate 4. Therefore, in the direction orthogonal to the longitudinal direction of the vibration substrate 4, it is possible to regulate the movement of the movable body 10.

Moreover, in the arrangement of the first embodiment, an adsorptive force on the end portions in a horizontal direction of the movable body 10 acts in the horizontal direction. Whereas, in the arrangement of the second embodiment, comparing with the arrangement of the first embodiment, all the adsorptive force acting on the end portions of the movable body 10 acts in a downward direction of the paper surface. Accordingly, in the arrangement of the second embodiment, it is possible to use the adsorptive force all the more efficiently.

Third Embodiment

Figure 2B:
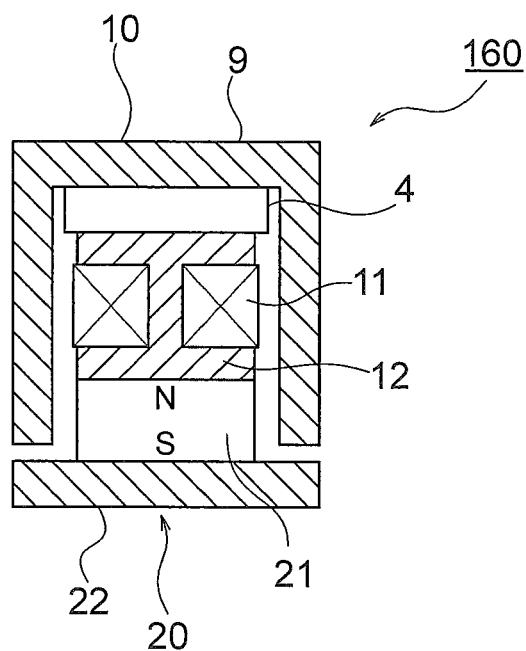
FIG. 2B is a diagram showing a structure of an inertial drive actuator according to a third embodiment of the present invention.

Next, an inertial drive actuator 160 according to a third embodiment of the present invention will be described below. FIG. 2B is a cross-sectional view of the inertial drive actuator 160. Same reference numerals are assigned to components which are same as in the inertial drive actuator 100 of the first embodiment, and repetitive description of such components is omitted.

The inertial drive actuator 160 of the third embodiment includes the piezoelectric element 3, the movable body 10, the vibration substrate 4, and the fixed body 20. The movable body 10 is positioned at the upper portion of the vibration substrate 4. Moreover, one end of the piezoelectric element 3 and one end of the vibration substrate 4 are connected mechanically.

Even in the third embodiment, since the coil 11 is provided toward the fixed body 20, no wire exists on the movable body 10. Therefore, the durability of wiring is improved and breaking of wire is prevented, thereby making it possible to carry out stable drive over a long period of time. Moreover, since no wire exists, it is possible to carry out stable drive without giving rise to a load, and therefore it is desirable.

Furthermore, a point of difference with the inertial drive actuator 100 of the first embodiment is as follows. The first yoke 9 has a shape that covers the vibration substrate 4, the coil 11, and the permanent magnet 21.

Moreover, the second yoke 22 is a member in the form of a plate provided to the bottom portion of the permanent magnet 21.

As aforementioned, the vibration substrate 4, the coil 11, and the permanent magnet 21 are covered by the first yoke 9 and the second yoke 22. Moreover, the first yoke 9 and the second yoke 22 are disposed such that the end portions of the first yoke 9 and the end portions of the second yoke 22 are close. Regarding these points, the arrangement is same as the arrangement in the inertial drive actuator 100 of the first embodiment.

Therefore, similarly as in the first embodiment, in the inertial drive actuator 160 of the third embodiment, there is no wearing away even when the movable body 10 is moved or driven. As a result, it is possible to move or to drive (to move to a desired position or to hold at a desired position) the movable body 10 stably over a long period of time.

Furthermore, in the inertial drive actuator 160 of the third embodiment, since the yoke is used, it is possible to suppress the leakage of the magnetic flux to the outside. Accordingly, since it is possible to generate efficiently the magnetic adsorptive force or the magnetic repulsive force, it is possible to move or to drive the movable body 10 efficiently.

Moreover, in the inertial drive actuator 160 of the third embodiment, the side surface of the first yoke 9 is positioned to be close, on the outer side of the vibration substrate 4. Furthermore, the side surface of the first yoke 9 is close to the coil 11 as well. Therefore, in the direction orthogonal to the longitudinal direction of the vibration substrate 4, the movement of the movable body 10 is regulated.

It is desirable to provide a protective member or a protective film to the coil 11 so that the coil 11 is not damaged even when the coil 11 makes a contact with the first yoke 9. Moreover, the coil 11 may be made small, and on the other hand, a size of a front end of a member around which the coil 11 has been wound (portion that is in contact with the vibration substrate 4) may be let to be a size same as the size of the vibration substrate 4. By making such an arrangement, in the direction orthogonal to the longitudinal direction of the vibration substrate 4, it is possible to regulate the movement of the movable body 10.

Fourth Embodiment

Figure 3A:
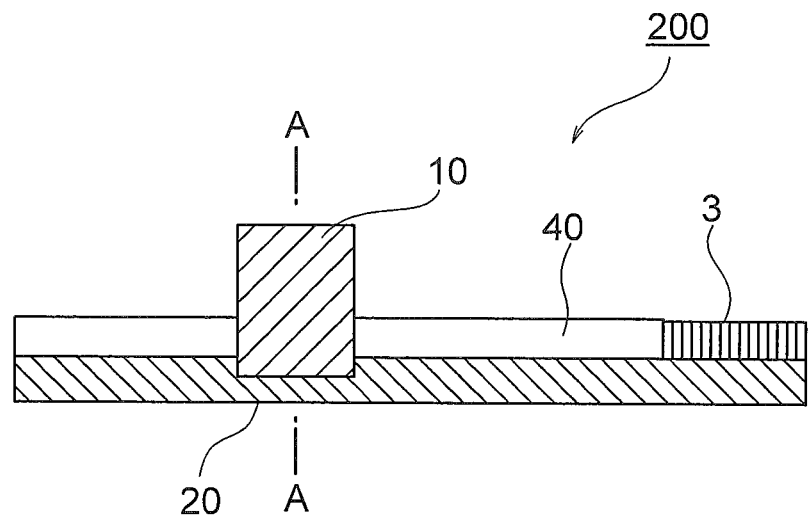
FIG. 3A and FIG. 3B are diagrams showing a structure of an inertial drive actuator according to a fourth embodiment of the present invention, where.
Figure 3B:
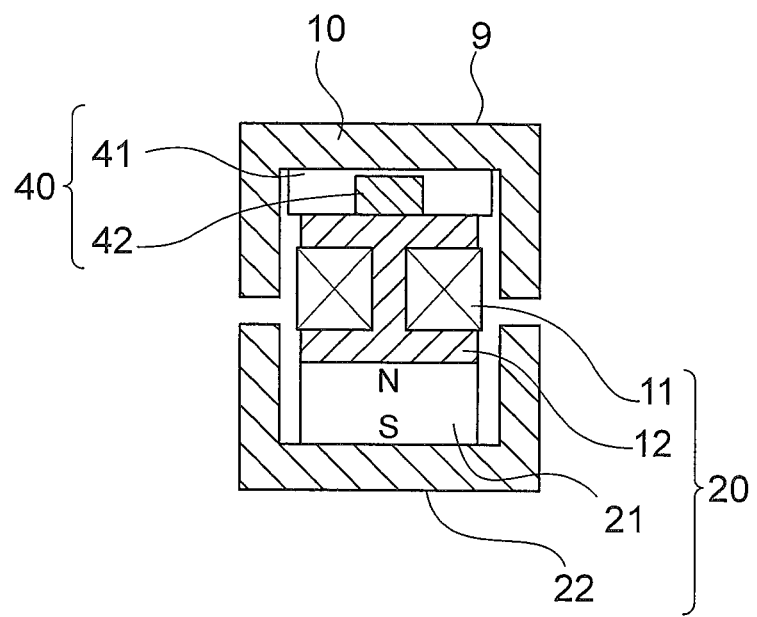

An inertial drive actuator 200 according to a fourth embodiment of the present invention is shown in FIG. 3A and FIG. 3B. FIG. 3A is a side view of the inertial drive actuator 200, and FIG. 3B is a cross-sectional view at a position shown by A-A in FIG. 3A.

The basic arrangement of the fourth embodiment is same as the abovementioned arrangement of the second embodiment. Same reference numerals are assigned to components which are same as in the inertial drive actuator 140 of the second embodiment, and repetitive description of such components is omitted.

In the inertial drive actuator 200 of the fourth embodiment, an arrangement of a vibration substrate 40 differs from the arrangement of the vibration substrate 4 in the inertial drive actuator 140 of the second embodiment. Therefore, the vibration substrate 40 will be described below.

In the inertial drive actuator 200 of the fourth embodiment, the vibration substrate 40 includes a non-magnetic portion 41 and a magnetic portion 42. The magnetic portion 42 is a yoke portion, and the non-magnetic portion 41 is positioned at two sides of the magnetic portion 42. An arrangement may be made such that, the non-magnetic portion 41 is provided to enclose the magnetic portion 42, and the magnetic portion 42 is positioned at an interior of the vibration substrate 40.

By making such arrangement, in the inertial drive actuator 200 of the fourth embodiment, when the magnetic flux flows between a central portion of the first yoke 9 and the coil 11, it is possible to suppress the leakage of the magnetic flux. As a result, it is possible to make the magnetic adsorptive force or the magnetic repulsive force act efficiently on the movable body 10.

Moreover, even in the fourth embodiment, since the coil 11 is provided toward the fixed body 20, no wire exists on the movable body 10. Therefore, the durability of wiring is improved and breaking of wire is prevented, thereby making it possible to carry out stable drive over a long period of time. Since the wire does not exist, it is possible to carry out stable drive without giving rise to any load, and therefore it is desirable.

Fifth Embodiment

Figure 4A:
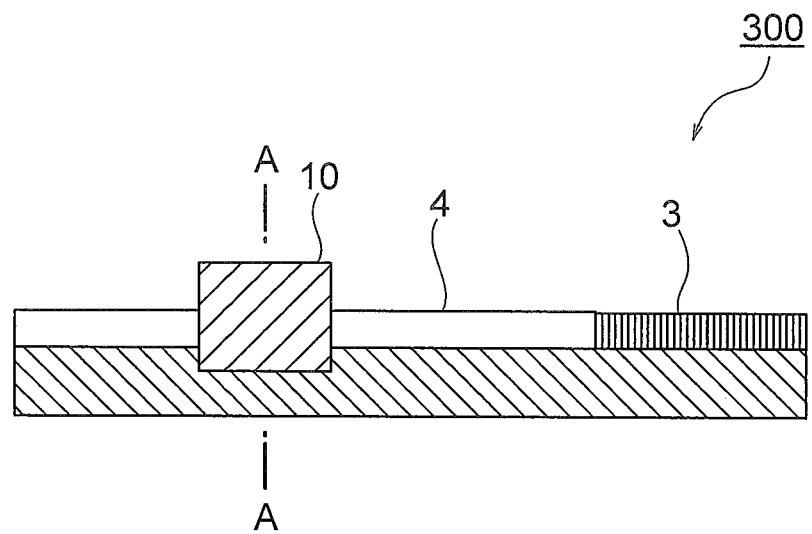
FIG. 4A and FIG. 4B are diagrams showing a structure of an inertial drive actuator according to a fifth embodiment of the present invention, where.
Figure 4B:
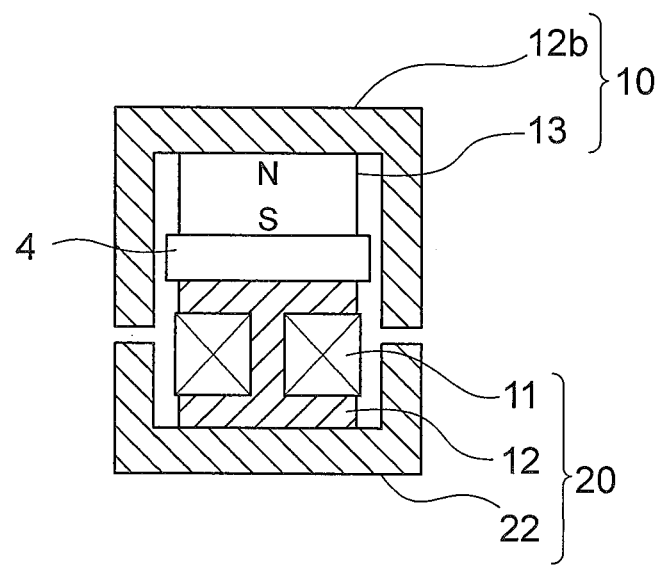

An inertial drive actuator 300 according to a fifth embodiment is shown in FIG. 4A and FIG. 4B.

FIG. 4A is a side view of the inertial drive actuator 300, and FIG. 4B is a cross-sectional view at a position shown by A-A in FIG. 4A. Same reference numerals are assigned to components of the inertial drive actuator 300 which are similar as in the inertial drive actuator 100 of the first embodiment, and description of such components is omitted. Wiring is omitted in the diagrams.

The inertial drive actuator 300 of the fifth embodiment includes the piezoelectric element 3, the vibration substrate 4, the movable body 10, and the fixed body 20. The piezoelectric element 3 and the vibration substrate 4 are positioned at the upper portion of the fixed body 20, and the movable body 10 is positioned at an upper portion of the vibration substrate 4.

The movable body 10 includes a first yoke 12b and a permanent magnet 13. The permanent magnet 13 is disposed such that the N-pole thereof is positioned toward the first yoke 12b. The first yoke 12b is formed such that a side surface thereof covers a part of the coil 11, the permanent magnet 13, and the vibration substrate 4.

On the other hand, the fixed body 20 includes the coil 11 and the second yokes 12 and 22. The fifth embodiment, comparing with the first embodiment, differs at a point that the permanent magnet 21 (second magnetic field generator) is provided toward the movable body 10.

In an arrangement such as the abovementioned arrangement, an electric current is passed through the coil 11 such that the N-pole is generated in an upward direction of the paper surface, and the S-pole is generated in a downward direction of the paper surface. As the electric current is passed through the coil 11, an opposite polarity is induced in the second yoke 22. Therefore, the N-pole is concentrated at a lower central portion of the second yoke 22, and the S-pole is concentrated at both upper end portions of the second yoke 22.

The permanent magnet 13 is disposed such that the upper portion becomes the N-pole and the lower portion becomes the S-pole. In the movable body 10, the opposite polarity is induced in the first yoke 12b. In other words, the S-pole is induced at the central portion of the first yoke 12b, and the N-pole is induced at both end portions of the first yoke 12b. As a result, a stronger magnetic adsorptive force is generated toward a lower side of the paper surface with respect to the movable body 10, as compared to a case in which, no electric current is passed through the coil 11.

On the other hand, in a case in which, an electric current is passed through the coil 11 such that the S-pole is concentrated in the upward direction of the paper surface, the magnetic adsorptive force weaker as compared to the magnetic adsorptive force when the electric current is not passed through the coil 11 is generated. Moreover, by changing the electric current passed through the coil 11, it is possible to change the strength of a normal force acting on the vibration substrate 4 of the movable body 10. By making such an arrangement, it is possible to control the frictional force between the movable body 10 and the vibration substrate 4.

As aforementioned, in the inertial drive actuator 300 of the fifth embodiment, the magnetic force has been used for moving or driving the movable body 10. In other words, in the inertial drive actuator 300 of the fifth embodiment, a member such as an elastic body which wears away when the inertial drive actuator 300 is driven, has not been used. Therefore, even when the movable body 10 is moved or driven, it is not worn away.

As a result, it is possible to move or to drive (to move to a desired position or to hold at a desired position) the movable 10 stably over a long period of time. Moreover, in the inertial drive actuator 300 of the fifth embodiment, since the yoke is used, it is possible to suppress the leakage of the magnetic flux to the outside. Accordingly, since it is possible to generate efficiently the magnetic adsorptive force or the magnetic repulsive force, it is possible to move or to drive the movable body 10 efficiently.

Furthermore, in the inertial drive actuator 300 of the fifth embodiment, two ends of the first yoke 12b are extended toward the second yoke 22, surrounding the two ends of the vibration substrate 4. Therefore, the movement of the movable body 10 in the leftward-rightward direction of the paper surface in FIG. 4B is restricted by the two ends of the first yoke 12b and the vibration substrate 4. In the inertial drive actuator 300 of the fifth embodiment, the two ends of the first yoke 12b are positioned adjacent to the coil 11. Therefore, it is possible to regulate the movement of the movable body 10 by using the coil 11 instead of the vibration substrate 4. While doing so, adequate protective measures have been taken so that there is no damage even when the coil 11 has made a contact with the movable body 10.

In such manner, in the inertial drive actuator 300 of the fifth embodiment, the first yoke 12a not only has the function of suppressing the leakage of the magnetic flux, but also has the guiding function of regulating the movement of the movable body 10 in a predetermined direction (the first yoke 12b assumes a plurality of functions).

Even in the fifth embodiment, since the coil 11 is provided toward the fixed body 20, no wire exists on the movable body 10. Therefore, the durability of wiring is improved and breaking of wire is prevented, thereby making it possible to carry out stable drive over a long period of time. Moreover, since no wire exists, it is possible to carry out stable drive without giving rise to a load, and therefore it is desirable.

Sixth Embodiment

Figure 5A:
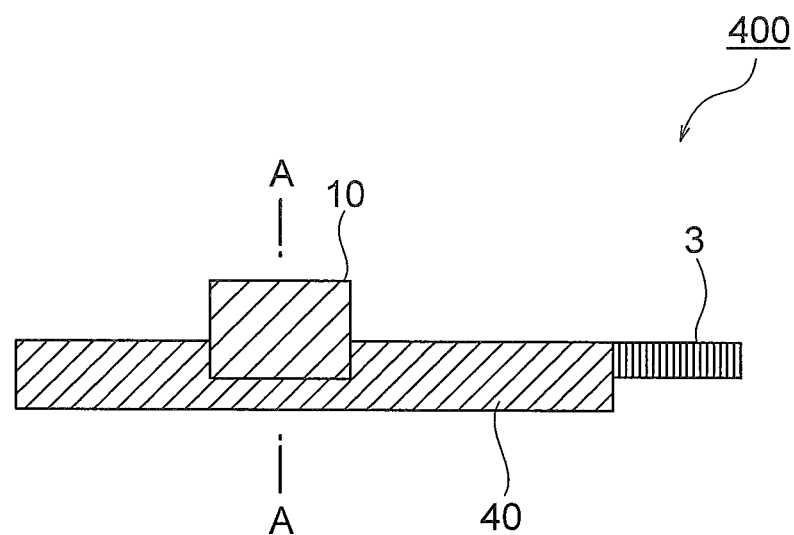
FIG. 5A and FIG. 5B are diagrams showing a structure of an inertial drive actuator according to a sixth embodiment of the present invention, where.
Figure 5B:
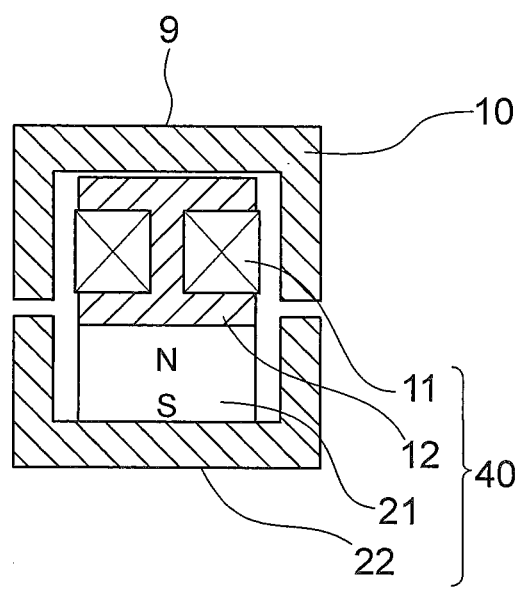

Next, an inertial drive actuator 400 according to a sixth embodiment of the present invention will be described below. FIG. 5A is a side view of the inertial drive actuator 400, and FIG. 5B is a cross-sectional view at a position shown by A-A in FIG. 5A. Same reference numerals are assigned to components of the inertial drive actuator 400 which are similar as in the inertial drive actuator 100 of the first embodiment, and description of such components is omitted.

The inertial drive actuator 400 of the sixth embodiment includes the piezoelectric element 3, the movable body 10, and the vibration substrate 40. The movable body 10 is positioned at the upper portion of the vibration substrate 40. Moreover, one end of the piezoelectric element 3 and one end of the vibration substrate 40 are connected mechanically. Details of an example of arrangement connecting the piezoelectric element 3 and the vibration substrate 40 will be described later.

The movable body 10 has a function of the first yoke 9. The structure of the movable body 10 being same as the structure of the movable body 10 (FIG. 2A) of the second embodiment, the description thereof is omitted. The movable 10 of the sixth embodiment has a similar function as of the movable body 10 of the first embodiment. However, in the sixth embodiment, a point that the inertial drive actuator 400 does not include the vibration substrate 4 of the second embodiment differs from the second embodiment. Instead, the vibration substrate 40 includes the coil 11, the permanent magnet 21, and the second yokes 12 and 22. The vibration substrate 40 functions similarly as the fixed body 20 of the second embodiment, and also functions as the vibration substrate 4.

Even in the sixth embodiment, since the coil is provided toward the vibration substrate (fixed body) 40, no wire exists on the movable body 10. Therefore, the durability of wiring is improved and breaking of wire is prevented, thereby making it possible to carry out stable drive over a long period of time. Moreover, since no wire exists, it is possible to carry out stable drive without giving rise to a load, and therefore it is desirable.

In such manner, since the inertial drive actuator 400 of the sixth embodiment includes members which carry out an action same as of the inertial drive actuator 100 of the first embodiment, an effect similar to the effect of the inertial drive actuator 100 of the first embodiment is shown.

Figure 6A:
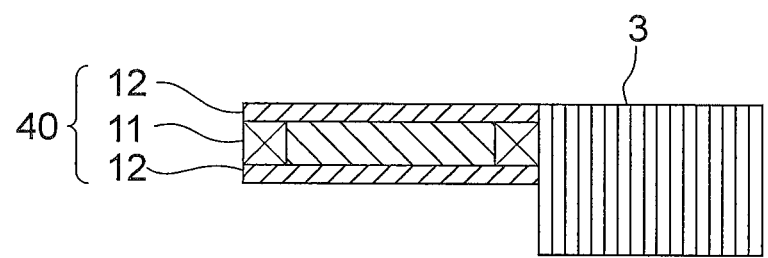
FIG. 6A, FIG. 6B, and FIG. 6C are diagrams showing three different arrangements for connecting a piezoelectric element and a vibration substrate.
Figure 6B:
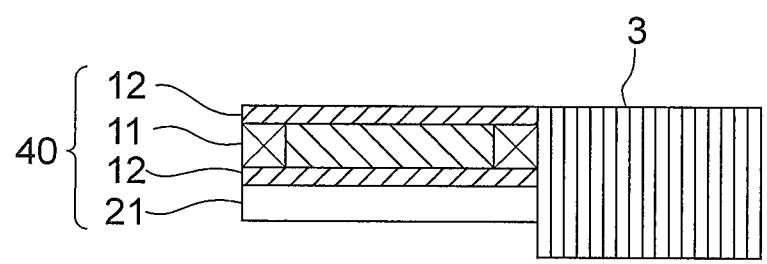
Figure 6C:
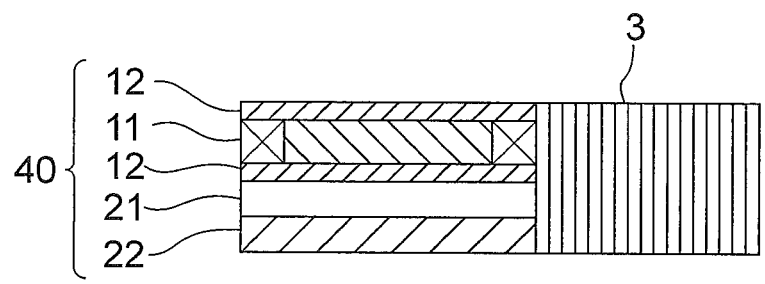

Next, the example of arrangement connecting the piezoelectric element 3 and the vibration substrate 40 will be described below. FIG. 6A, FIG. 6B, and FIG. 6C show three different arrangements connecting the piezoelectric element 3 and the vibration substrate 40.

FIG. 6A shows an arrangement in which, only the coil 11 is connected to and vibrates with the piezoelectric element 3. In other words, the arrangement is such that at least a part of the vibration substrate 40 includes the coil 11 (first magnetic field generator). Accordingly, since the vibration substrate 40 is the coil 11, it is possible to let the arrangement simple.

FIG. 6B shows an arrangement in which, the coil 11 and the permanent magnet 21 are connected to and vibrate with the piezoelectric element 3. Here, an arrangement may be such that only the piezoelectric element 3 and the permanent magnet 21 are connected and vibrate. Accordingly, it is possible to maintain the movable body 10 with a constant magnetic attractive force all the time.

FIG. 6C is an arrangement in which, the coil 11, the permanent magnet 21, and the second yoke 22 are connected to and vibrate with the piezoelectric element 3. Accordingly, as the yoke is used, it is possible to suppress the leakage of the magnetic flux to the outside. Consequently, it is possible to generate efficiently the magnetic adsorptive force and the magnet repulsive force. Moreover, it is possible to reduce the number of components. Therefore, it is possible to move or to drive the movable body 10 efficiently while having a simple and low-cost arrangement.

As a further effect of the arrangement in FIG. 6C, comparing with the abovementioned arrangement in FIGS. 6A and 6B at the time of vibration, since there is no adsorptive force of a magnet acting perpendicular to the direction of vibration, the piezoelectric element 3 is capable of making the coil 11, the permanent magnet 21, and the yoke 22 vibrate with a small force.

Here, an arrangement may be an arrangement in which, only the piezoelectric element 3 and the second yoke 22 are connected, or an arrangement in which, only the piezoelectric element 3 and the second yoke 22, and the coil 11 are connected, or an arrangement in which, only the piezoelectric element 3, the second yoke 22, and the permanent magnet 21 are connected and vibrate.

In the arrangements shown in FIG. 6A, FIG. 6B, and FIG. 6C, it is possible to move the movable body 10 by placing the movable body 10 at an upper-surface side of the vibration substrate 40. Even in these examples of arrangement, the magnetic force is used for moving or driving the movable body 10. In other words, in the inertial drive actuators of these examples of arrangement, no member such as an elastic body which is worn away when driven has been used. Therefore, there is no wearing away even when the movable body 10 is moved or driven. As a result, it is possible to move or to drive (to move to a desired position or to hold at a desired position) the movable body 10 stably over a long period of time. Moreover, in the inertial drive actuators of these examples of arrangement, since the yoke is used, it is possible to suppress the leakage of the magnetic flux to the outside. Accordingly, it is possible to generate efficiently the magnetic adsorptive force or the magnetic repulsive force. Therefore, it is possible to move or to drive the movable body efficiently while having a simple and low-cost arrangement.

Furthermore, as aforementioned, since no wire exists on the movable body 10, the durability of wiring is improved and breaking of wire is prevented, thereby making it possible to carry out stable drive over a long period of time. Moreover, since no wire exists, it is possible to carry out stable drive without giving rise to a load, and therefore it is desirable.

Next, a driving method for driving the abovementioned inertial drive actuator 100 will be described below.

Figure 7:
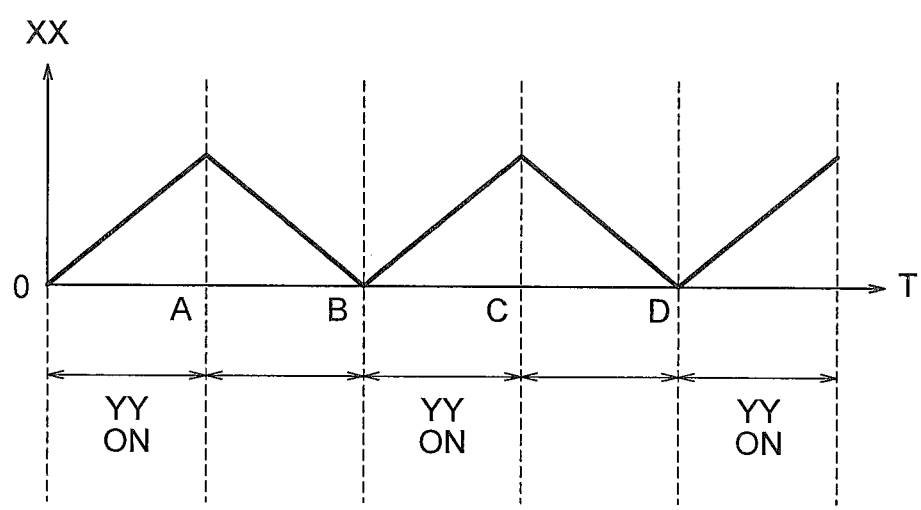
FIG. 7 is a diagram showing a driving method for driving the inertial drive actuator according to the first embodiment.

FIG. 7 shows the driving method for driving the inertial drive actuator 100 of the first embodiment. In FIG. 7, a horizontal axis indicates time T and a vertical axis indicates displacement XX of the piezoelectric element 3. In FIG. 1A, a case in which, the piezoelectric element 3 has been elongated in a leftward direction of the paper surface is let to be positive.

Moreover, the magnetic adsorption is indicated by YY. For reference numerals such as time T in the diagram, same reference numerals are used in FIG. 9A, FIG. 9B, and FIG. 9C, and FIG. 10A, FIG. 10B, and FIG. 10C.

During a period from time 0 to time A, the piezoelectric element 3 is elongated. During this period, the electric current is passed through the coil 11 such that the N-pole is generated in the upward direction of the paper surface in the coil 11. As the N-pole is generated in the coil 11, the magnetic adsorptive force acting toward the vibration substrate 4 in the movable body 10, increases. Therefore, the friction between the movable body 10 and the vibration substrate 4 increases. As a result, with the elongation of the piezoelectric element 3, the vibration substrate 4 moves toward the leftward direction of the paper surface, and the movable body 10 also moves together in the leftward direction of the paper surface.

Next, during a period from time A to time B, the piezoelectric element 3 contracts. During this period, the passing of the electric current to the coil 11 is stopped. As the passing of the electric current to the coil 11 is stopped, the magnetic adsorptive force generated by the coil 11 ceases to act on the movable body 11. Therefore, the frictional force between the movable body 10 and the vibration substrate 4 decreases. This means that an amount of sliding of the movable body 10 with respect to the vibration substrate 4 has increased. As a result, even when the vibration substrate 4 moves in the rightward direction of the paper surface with the contraction of the piezoelectric element 3, apparently, the movable body 10 assumes a state of having come to rest at a position to which it has moved. In such manner, since the movable body 10 slides in the leftward direction with respect to the vibration substrate 4 which moves in the rightward direction of the paper surface along with the contraction of the piezoelectric element 3, during a period from time 0 to time B, the movable body 10 moves in the leftward direction of the paper surface. By repeating the same operation during a period from time B to time C, and a period from time C to time D, it is possible to continue to move the movable body in the leftward direction of the paper surface.

It is possible to move the movable body 10 in the rightward direction of the paper surface by reversing the timing of passing the electric current through the coil 11 as shown in FIG. 7. In other words, without passing the electric current through the coil 11 during the period from time 0 to time A (while the vibration substrate 4 elongates), the electric current is passed through the coil 11 during the period from time A to time B (while the vibration substrate 4 contracts) such that the N-pole is generated in the upward direction of the paper surface. By doing so, it is possible to move the movable body 10 in the rightward direction of the paper surface.

In the example of moving rightward, the passing of current through the coil 11 is stopped during the period from time A to time B. Instead, the electric current may be passed through the coil 11 such that the magnetic repulsive force acts toward the vibration substrate 4 on the movable body 10 (or, such that the magnetic adsorptive force decreases). By doing so, it is possible to move the body 10 in the leftward direction of the paper surface.

As aforementioned, in a case of not passing the electric current through the coil 11, the frictional force between the movable body 10 and the vibration substrate 4 decreases, and as a result, an arrangement has been made such that, even when the vibration substrate 4 moves in the rightward direction of the paper surface, apparently, the movable body 10 assumes a state of having come to rest at the position to which it has moved. However, if specifications (such as material, weight, and length) of the movable body 10 (first yoke), the coil 11, the second yoke 12, and the permanent magnet 13 are selected appropriately, it is possible to maintain the frictional force between the movable body 10 and the vibration substrate 4 to certain degree even in a case of not passing the electric current through the coil 11.

Therefore, if an arrangement is made such that no electric current is passed through the coil 11 during the period from time 0 to time A, it is possible to move the vibration substrate 4 in the leftward direction of the paper surface with the elongation of the piezoelectric element 3. Moreover, an arrangement is to be made such that, during the period from time A to time B, the electric current is passed through the coil 11 such that the magnetic repulsive force acts towards the vibration substrate 4 on the movable body 10. Even when such an arrangement is made, it is possible to continue to move the movable body 10 in the leftward direction of the paper surface.

Moreover, in a case of driving the inertial drive actuator 120 of the modified example of the first embodiment, the following arrangement is made. During the period from time 0 to time A, the electric current is passed through the coil 11 such that the N-pole is generated in the upward direction of the paper surface. As the electric current is passed through the coil 11, the friction between the movable body 10 and the vibration substrate 4, increases. As a result, the vibration substrate 4 moves in the leftward direction of the paper surface, with the elongation of the piezoelectric element 3, and the movable body 10 moves in the leftward direction of the paper surface, with the movement of the vibration substrate 4.

Next, during the period from time A to time B, the passing of the electric current to the coil 11 is stopped. As the passing of the electric current to the coil 11 is stopped, the friction between the movable body 10 and the vibration substrate 4 decreases. As a result, even when the vibration substrate 4 moves in the rightward direction of the paper surface with the contraction of the piezoelectric element 3, apparently, the movable body 10 assumes a state of having come to rest at the position to which it has moved. By doing so, it is possible to move the movable body 10 in the leftward direction of the paper surface.

It is needless to mention that, it is possible to move the movable body 10 in the rightward direction of the paper surface by changing the timing of passing the electric current through the coil 11 as aforementioned. Moreover, even by reversing the direction of passing the current through the coil 11, it is possible to move the movable body 10.

Seventh Embodiment

Next, an inertial drive actuator 500 according to a seventh embodiment of the present invention will be described below.

Figure 8A:
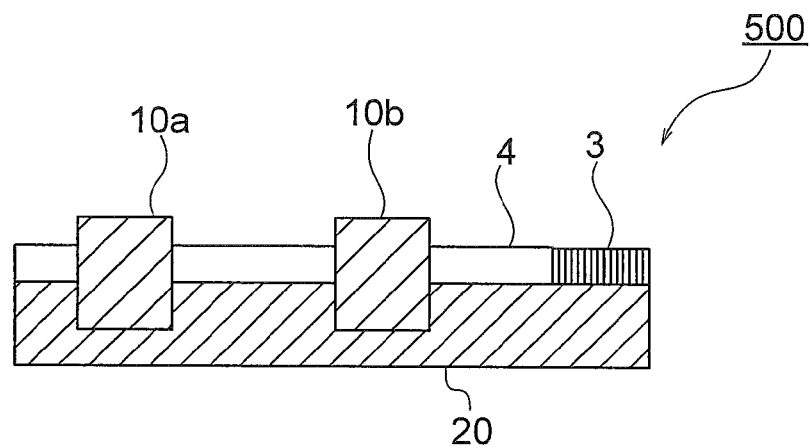
FIG. 8A, FIG. 8B, and FIG. 8C are diagrams showing a structure of an inertial drive actuator according to a seventh embodiment of the present invention, where.
Figure 8B:
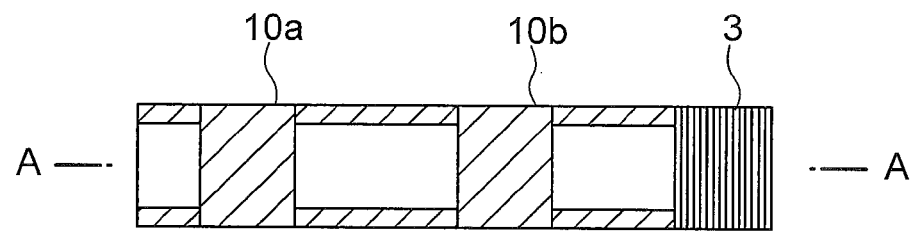
Figure 8C:
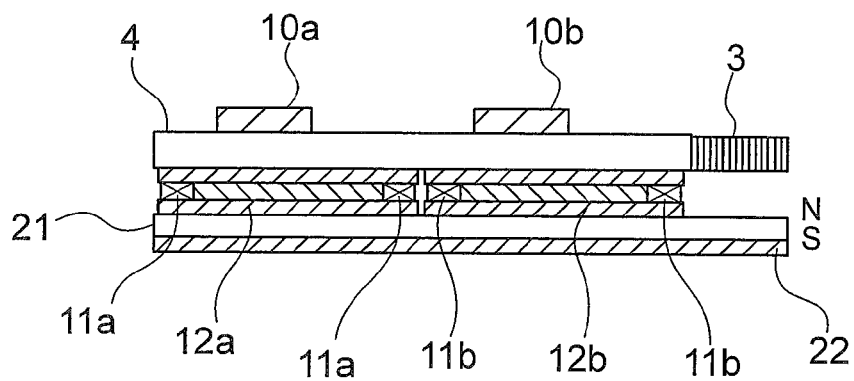
Figure 9A:
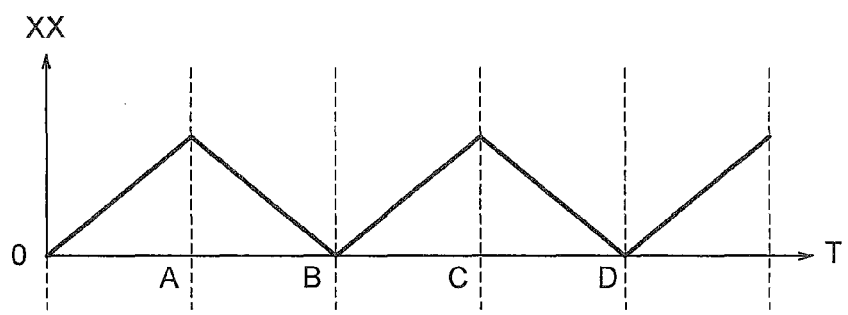
FIG. 9A, FIG. 9B, and FIG. 9C are diagrams showing a driving method for driving the inertial drive actuator according to the seventh embodiment.
Figure 9B:
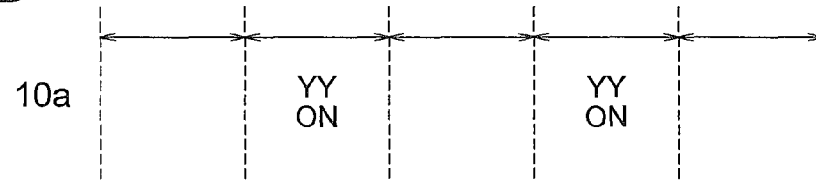
Figure 9C:
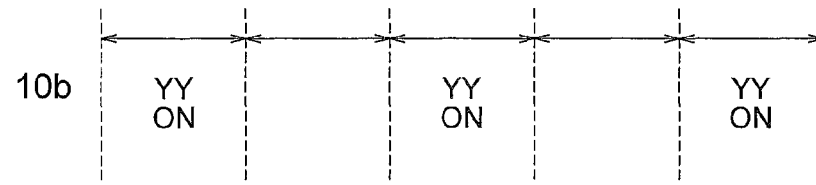
Figure 10A:
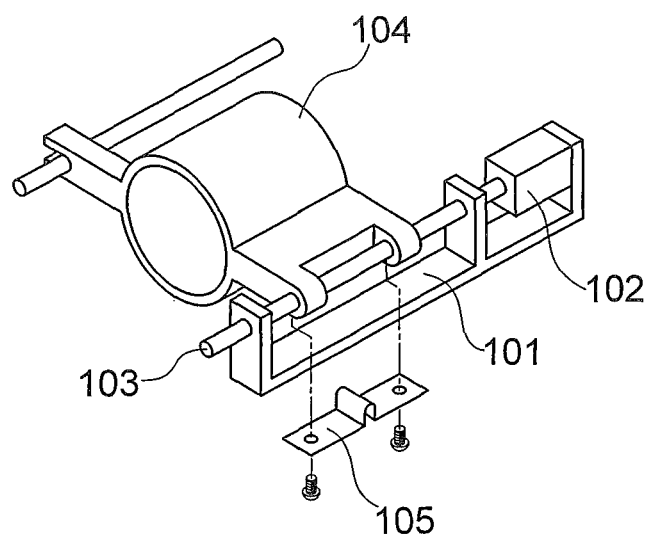
FIG. 10A, FIG. 10B, and FIG. 10C are diagrams showing a conventional impact drive actuator, where.
Figure 10B:
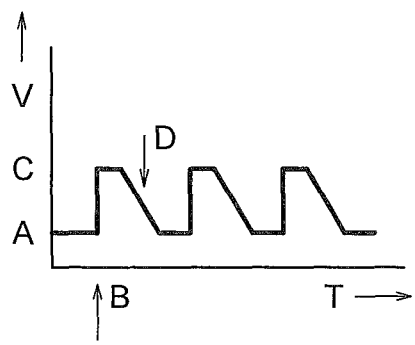
Figure 10C:
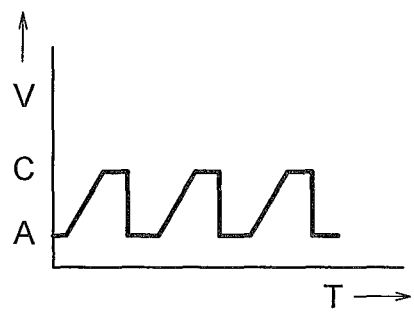

FIG. 8A is a side view of the inertial drive actuator 500, FIG. 8B is a top view of the inertial drive actuator 500, and FIG. 8C is a cross-sectional view of the inertial drive actuator 500. Moreover, FIG. 9A, FIG. 9B, and FIG. 9C show a driving method for driving the inertial drive actuator 500 of the seventh embodiment.

The inertial drive actuator 500 of the seventh embodiment includes two movable bodies 10 in the inertial drive actuator 100 of the first embodiment. In other words, the inertial drive actuator 500 of the seventh embodiment includes the piezoelectric element 3, the vibration substrate 4, a movable body 10a, a movable body 10b, and the fixed body 20. The piezoelectric element 3 and the vibration substrate 4 are positioned at an upper portion of the fixed body 20, and the movable body 10a and the movable body 10b are positioned at an upper portion of the vibration substrate 4.

The driving method for driving the inertial drive actuator 500 will be described below. In FIG. 9A, FIG. 9B, and FIG. 9C, a horizontal axis indicates time, and a vertical axis indicates displacement of the piezoelectric element 3. In FIG. 9A, FIG. 9B, and FIG. 9C, a case in which, the piezoelectric element 3 has been elongated in the leftward direction of the paper surface is let to be positive.

As shown in the cross-sectional view in FIG. 8C, in the seventh embodiment, in a range in which the movable body 10a moves, a coil 11a is provided toward the fixed body 20. Similarly, in a range in which, the movable body 10b moves, the coil 11b is provided toward the fixed body 20. In other words, a coil corresponding to each movable body is necessary. The coil 11a is used for changing attraction of the movable body 10a. The coil 11b is used for changing attraction of the movable body 10b.

During a period from time 0 to time A, the piezoelectric element 3 elongates. During this period, no electric current is passed through the coil 11a of the movable body 10a. In this case, the magnetic adsorptive force ceases to act on the movable body 10a. Therefore, the movable body 10a is stationary as it has been, without changing the position. Whereas, the current is passed through the coil 11b of the movable body 10b such that the N-pole is generated in the upward direction of the paper surface. In this case, the magnetic adsorptive force acts toward the vibration substrate 4 on the movable body 10b as explained by referring to FIG. 6A, FIG. 6B, and FIG. 6C. Therefore, the movable body 10b moves in the leftward direction of the paper surface.

Next, during a period from time A to time B, the piezoelectric element 3 contracts. During this period, the electric current is passed through the coil 11a of the movable body 10a such that the N-pole is generated in the upward direction of the paper surface. In this case, as explained by referring to FIG. 1C, the magnetic adsorptive force toward the vibration substrate 4 acts on the movable body 10a. Therefore, the movable body 10a moves in the rightward direction of the paper surface. On the other hand, no electric current is passed through the coil 11b of the movable body 10b. In this case, the magnetic adsorptive force ceases to act on the movable body 10b. Therefore, the movable body 10b is stationary as it has been, without changing the position.

As aforementioned, during the period from time 0 to time A, the movable body 10a is stationary, and the movable body 10b moves in the leftward direction of the paper surface, or in other words, moves toward the movable body 10a. Whereas, during the period from time A to time B, the movable body 10a moves in the rightward direction of the paper surface, or in other words, moves toward the movable body 10b, and the movable body 10b is stationary. As a result, it is possible to bring the movable body 10a and the movable body 10b closer. Moreover, it is possible to bring the movable body 10a and the movable body 10b even closer by repeating the driving method during a period from time 0 to time B. Furthermore, if the driving method is changed, it is possible to move the movable body 10a and the movable body 10b in the same direction, or to draw further apart the movable body 10a and the movable body 10b.

In FIG. 8A, FIG. 8B, and FIG. 8C, and FIG. 9A, FIG. 9B, and FIG. 9C, an arrangement of two movable bodies and the driving method thereof have been illustrated for explaining. In principle, even for two or more than two movable bodies, it is possible to drive each body independently on the same vibration substrate.

Moreover, even in the seventh embodiment, since the coil 11 is provided toward the fixed body 20, no wire exists on the movable body 10. Therefore, the durability of wiring is improved and breaking of wire is prevented, thereby making it possible to drive stably over a long period of time. Moreover, since no wire exists, it is possible to carry out stable drive without giving rise to any load, and therefore it is desirable.

The present invention can have various modified examples without departing from the scope of the invention.

As aforementioned, the present invention is suitable for an inertial drive actuator which is capable of carrying out a stable operation over a long period of time, such as moving the movable body to a desired position, bringing the body to rest at a desired position, and maintaining the state of being at rest.

According to the present invention, it is possible to provide an inertial drive actuator which enables to reduce an effect of factors such as wearing away by using the magnetic force, to move or to drive a movable body efficiently by using a yoke, and in which, the durability of wiring is improved and breaking of wire is prevented, thereby making it possible to carry out stable drive over a long period of time.

What is claim is:

1. An inertial drive actuator comprising:
    a displacement unit which causes a minute displacement in a first direction and in a second direction, the second direction being opposite to the first direction;
    a vibration substrate which undergoes reciprocating movement due to the minute displacement caused by the displacement unit;
    a first magnetic field generator which generates a magnetic field;
    a movable body disposed on a surface of the vibration substrate, the movable body being movable in a longitudinal direction and including a first yoke having first end portions, the first yoke concentrating a magnetic flux of an N-pole and an S-pole generated by the first magnetic field generator, at a predetermined position; and
    a second yoke having second end portions, the second yoke being disposed on a side of the vibration substrate, opposite to the surface on which the movable body is disposed, wherein
    the first end portions of the first yoke and the second end portions of the second yoke are configured to face each other to mechanically regulate a movement of the movable body in a direction perpendicular to the longitudinal direction, and
    the movable body is driven by a frictional force acting between the movable body and the vibration substrate that is controlled by controlling the magnetic field generated by the first magnetic field generator.

2. The inertial drive actuator according to claim 1, further comprising:
    a second magnetic field generator, which generates a magnetic field in addition to the magnetic field generated by the first magnetic field generator so that, a magnetic attractive force or a magnetic repulsive force acts in a direction of the movable body, opposite to the vibration substrate.

3. The inertial drive actuator according to claim 1, wherein the first magnetic field generator is an electromagnetic coil.

4. The inertial drive actuator according to claim 2, wherein the second magnetic field generator is a permanent magnet.

5. The inertial drive actuator according to claim 1, wherein the displacement unit is a piezoelectric element.

6. The inertial drive actuator according to claim 1, wherein the vibration substrate is a non-magnetic body.

7. The inertial drive actuator according to claim 1, wherein the vibration substrate includes a non-magnetic portion and a magnetic portion.

8. The inertial drive actuator according to claim 1, wherein at a least a part of the vibration substrate includes the first magnetic field generator.

9. The inertial drive actuator according to claim 2, wherein at least a part of the vibration substrate includes the second magnetic field generator.

10. The inertial drive actuator according to claim 1, wherein the vibration substrate functions also as the second yoke.

11. The inertial drive actuator according to claim 1, wherein the movable body includes a permanent magnet.

* * * * *